United States Patent
Peng et al.

(10) Patent No.: US 9,307,120 B1
(45) Date of Patent: Apr. 5, 2016

(54) IMAGE PROCESSING SYSTEM ADAPTABLE TO A DUAL-MODE IMAGE DEVICE

(71) Applicant: Himax Imaging Limited, Tainan (TW)

(72) Inventors: Yuan-Chih Peng, Tainan (TW); Po-Chang Chen, Tainan (TW)

(73) Assignee: HIMAX IMAGING LIMITED, Tainan (TW)

( * ) Notice: Subject to any disclaimer, the term of this patent is extended or adjusted under 35 U.S.C. 154(b) by 0 days.

(21) Appl. No.: 14/548,017

(22) Filed: Nov. 19, 2014

(51) Int. Cl.
*G06K 9/00* (2006.01)
*H04N 1/60* (2006.01)
*G06T 5/00* (2006.01)
*G06T 5/20* (2006.01)
*H04N 5/374* (2011.01)

(52) U.S. Cl.
CPC ........ *H04N 1/60* (2013.01); *G06T 5/001* (2013.01); *G06T 5/008* (2013.01); *G06T 5/20* (2013.01); *H04N 5/374* (2013.01); *G06T 2207/10024* (2013.01); *G06T 2207/20024* (2013.01)

(58) Field of Classification Search
CPC ............. G06T 5/001; G06T 5/20; G06T 5/40; H04N 1/60217; H04N 9/045
See application file for complete search history.

(56) References Cited

U.S. PATENT DOCUMENTS

| | | | | |
|---|---|---|---|---|
| 5,652,831 A * | 7/1997 | Huang | ............... | G06T 11/001 345/604 |
| 6,249,321 B1 * | 6/2001 | Bae | ............... | H04N 5/211 348/607 |
| 7,528,991 B2 * | 5/2009 | Naccari | ............... | G06K 9/00664 358/1.9 |
| 8,059,187 B2 * | 11/2011 | Nakajima | ............... | H04N 5/23219 348/362 |
| 8,300,931 B2 * | 10/2012 | Lee | ............... | G06T 5/009 358/523 |
| 8,471,921 B1 * | 6/2013 | Li | ............... | H04N 9/045 348/222.1 |
| 8,488,015 B2 * | 7/2013 | Prentice | ............... | H04N 5/23245 348/221.1 |
| 8,948,508 B2 * | 2/2015 | Zheng | ............... | G06K 9/00 382/162 |

* cited by examiner

*Primary Examiner* — Amir Alavi
(74) *Attorney, Agent, or Firm* — Tim Tingkang Xia, Esq.; Locke Lord LLP

(57) ABSTRACT

An image processing system adaptable to a dual-mode image device includes an adaptive color correction system coupled to receive an image, and configured to adaptively correct for color distortion according to a chief ray angle (CRA) of a pixel of the image and an IR signal from the dual-mode image device associated with a light source.

16 Claims, 9 Drawing Sheets

IMAGE PROCESSING SYSTEM ADAPTABLE TO A DUAL-MODE IMAGE DEVICE

BACKGROUND OF THE INVENTION

1. Field of the Invention

The present invention generally relates to an image processing system, and more particularly to an adaptive color correction system adaptable to a dual-mode image device.

2. Description of Related Art

In an imaging system, lens shading is a phenomenon that causes pixels located away from a center pixel of a pixel array to have a lower pixel signal value even when all pixels are exposed to the same illumination condition. As a result, brightness of an image falls off from center to corners. In other words, maximum brightness may be at or around the center but fall along a radius of the pixel array. The lens shading phenomenon may be resulted, for example, from lens mechanism, optics, sensor pixels, ray traveling distance, aperture effect or ray incident angle to pixels.

Lens shading correction (LSC) is thus commonly proposed to compensate for the brightness falloff by applying different gains, particularly for the pixels away from the center of the pixel array.

A complementary metal-oxide-semiconductor (CMOS) image sensor not only senses radiance in visible band but also radiance in near-infrared (IR) band. An IR-cut filter is used to pass the visible band wavelengths and block IR band wavelengths, such that discoloration caused by IR band wavelengths may be avoided. In some applications like surveillance, however, artificial IR light may be applied to increase visibility in low-light condition. To receive IR band signals in low light with the artificial IR light and avoid discoloration in normal light scene without the artificial IR light, a dual-band IR-cut filter may be used.

Color correction is commonly applied in an image processing system in order to correct for color distortion. A need has arisen to propose a novel color correction scheme that is adaptable to some applications like surveillance.

SUMMARY OF THE INVENTION

In view of the foregoing, it is an object of the embodiment of the present invention to provide an image processing system adaptable to a dual-mode image device, in which correction on a pixel of the image is performed according to a chief ray angle (CRA) of the pixel and an IR signal associated with a light source.

According to one embodiment, an image processing system adaptable to a dual-mode image device includes an adaptive color correction system coupled to receive an image, and configured to adaptively correct for color distortion according to a chief ray angle (CRA) of a pixel of the image and an IR signal from the dual-mode image device associated with a light source.

DETAILED DESCRIPTION OF THE INVENTION

Figure 1:
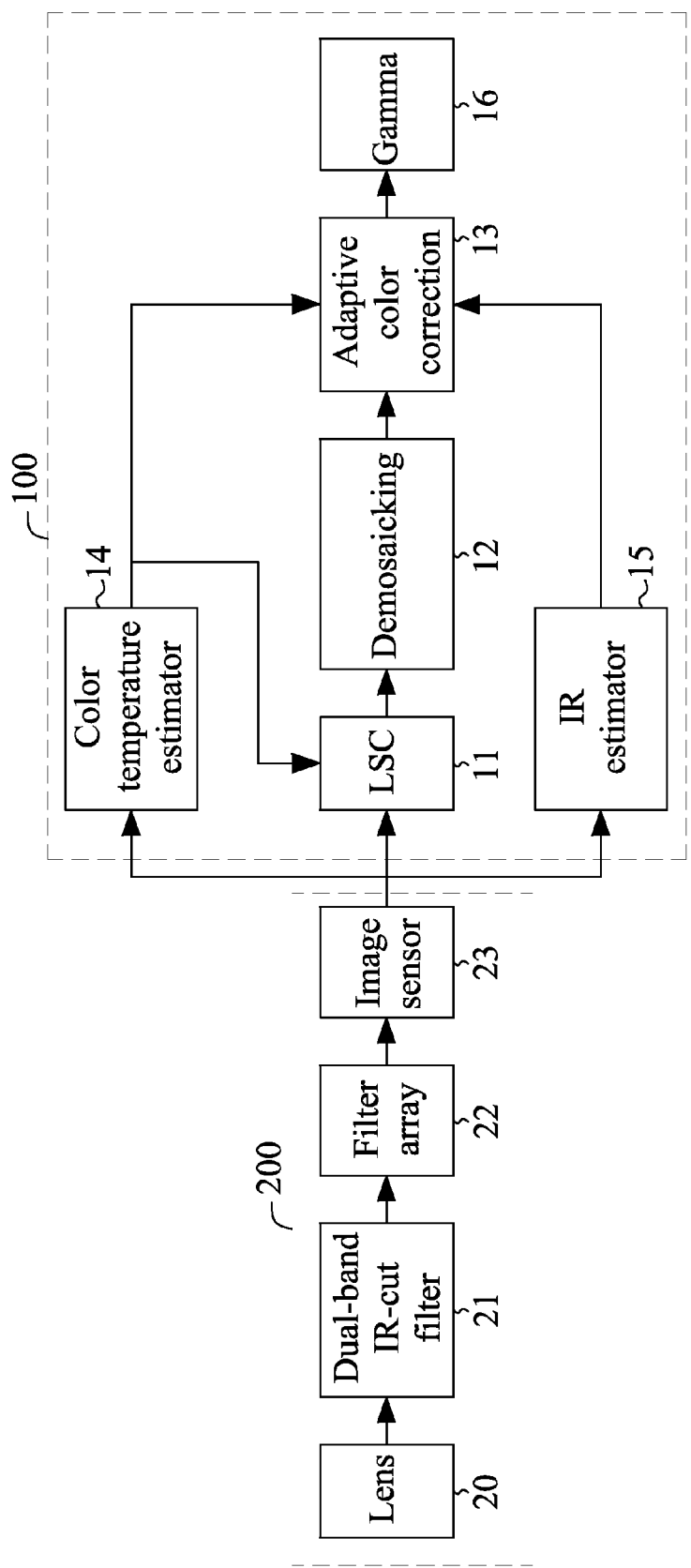
FIG. 1 shows a block diagram illustrating an image processing system adaptable to a dual-mode image device according to one embodiment of the present invention.

FIG. 1 shows a block diagram illustrating an image processing system 100 adaptable to a dual-mode image device 200 according to one embodiment of the present invention. The dual-mode image device 200 primarily includes a lens 20 which passes, e.g., transmits and refracts, light. In the specification, the term "lens" may refer to either a single lens or an assembly of lenses.

Figures 2A, 2B:
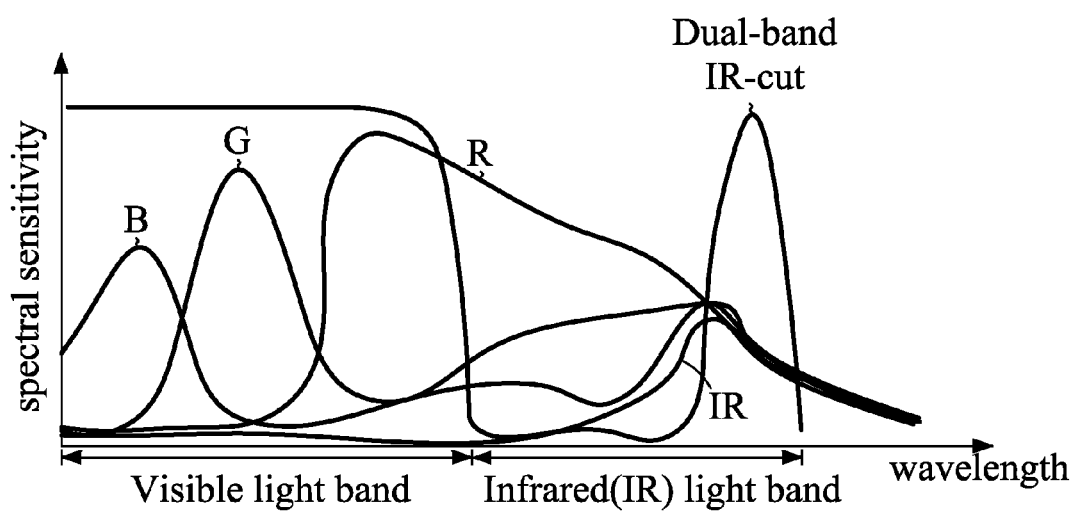
FIG. 2A shows an exemplary arrangement of the color filters and IR filters constructing the filter array of FIG. 1.
FIG. 2B shows an exemplary spectral sensitivity of the dual-band IR-cut filter and the filter array of FIG. 1.

The dual-mode image device 200 also includes a dual-band IR-cut filter 21 that is optically coupled to receive the light passed from the lens 20 in order to pass visible light (in a first band) and a range of IR light (in a second band). The dual-mode image device 200 further includes a filter array 22 that is composed of color filters (e.g., red (R), green (G) and blue (B) filter) and infrared (IR) filters. The filter array 22 is optically coupled to receive the light passed from the dual-band IR-cut filter 21 in order to generate optical color information. FIG. 2A shows an exemplary arrangement of the color filters and IR filters constructing the filter array 22 of FIG. 1. This exemplary filter array 22 is 25% red, 25% green, 25% blue and 25% infrared. FIG. 2B shows an exemplary spectral sensitivity of the dual-band IR-cut filter 21 and the filter array 22 of FIG. 1.

The dual-mode image device 200 further includes an image sensor 23, such as a complementary metal-oxide-semiconductor (CMOS) image sensor, that is disposed below the filter array 22 to convert the optical color information to an electronic signal, which is then subjected to processing by the image processing system 100. In the specification, the composing blocks of the image processing system 100 may refer to a structural or functional entity that may be performed, for example, by circuitry such as a digital image processor.

In the embodiment, the image processing system 100 may include a lens shading correction (LSC) unit 11 that is used to correct for lens shading artifacts. The details of LSC may be referred to, for example, U.S. Pat. No. 8,228,406 by Kuo et al., entitled "Adaptive lens shading correction" or U.S. Pat. No. 8,130,292 by Lee, entitled "Scene illumination adaptive lens shading correction for imaging devices," disclosures of which are incorporated herein by reference.

The image processing system 100 may also include a demosaicking unit 12 that is coupled to receive an output of the LSC unit 11, and is configured to reconstruct a full color image from the incomplete color samples outputted from the image sensor 23 overlaid with the filter array 22. The demosaicking unit 12 may be typically performed, for example, by interpolation technique.

The image processing system 100 of the embodiment may include an adaptive color correction system 13 that is coupled to receive a (full color) image reconstructed by the demosaicking unit 12, and is configured to adaptively correct for color distortion. According to one aspect of the embodiment, the adaptive color correction system 13 performs correction on a pixel of the image according to a chief ray angle (CRA) of the pixel and an IR signal (from the image sensor 23) associated with a light source. Alternatively, the adaptive color correction system 13 performs correction on a pixel of the image according to a chief ray angle (CRA) of the pixel, a color temperature of a light source, and an IR signal associated with a light source. In the specification, a pixel located farther away from a center of the lens 20 has a higher CRA than a pixel located nearer the center of the lens 20.

Figure 3A:
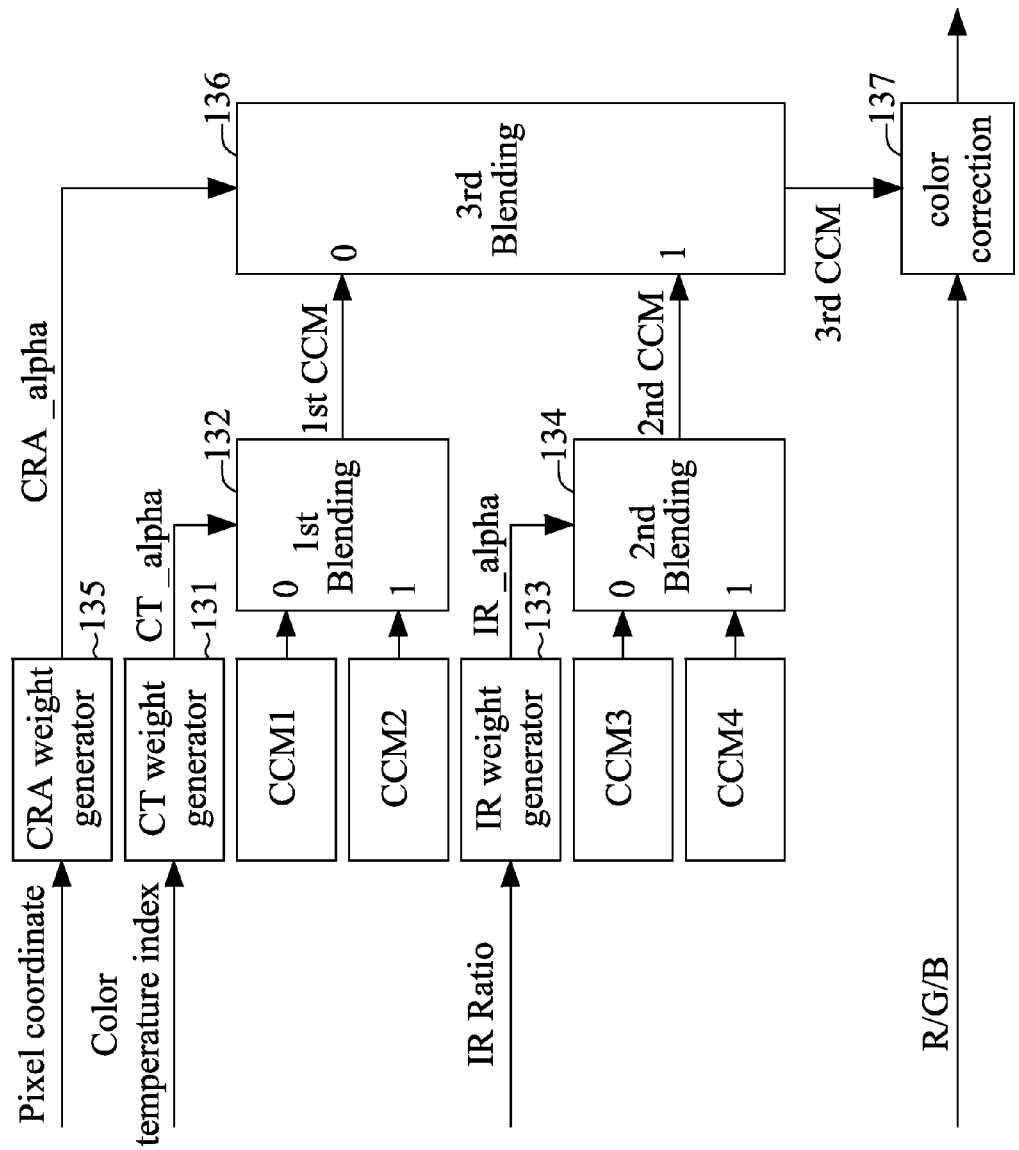
FIG. 3A shows a detailed block diagram of the adaptive color correction system of FIG. 1 according to a first specific embodiment of the present invention.

FIG. 3A shows a detailed block diagram of the adaptive color correction system 13 of FIG. 1 according to a first specific embodiment of the present invention. In the embodiment, four color correction matrices CCM1, CCM2, CCM3 and CCM4 are provided. Specifically, CCM1 represents a color correction matrix for a high color-temperature light source and for an image center, CCM2 represents a color correction matrix for a low color-temperature light source and for an image center, CCM3 represents a color correction matrix for a light source with a low(-intensity) IR signal and for an image corner, and CCM4 represents a color correction matrix for a light source with a high(-intensity) IR signal and for an image corner. In the specification, the terms "high" and "low" are used in a comparative sense when compared to each other. Alternatively, a high color-temperature is a color temperature higher than a predefined value, and a low color temperature is a color temperature lower than the predefined value. Likewise, a high intensity is an intensity higher than a predetermined value, and a low intensity is an intensity lower than the predetermined value.

The adaptive color correction system 13 may include a color temperature (CT) weight generator 131 that is coupled to receive a color temperature index, which may be provided, for example, by a color temperature estimator 14. The CT weight generator 131 is configured to generate a color temperature (CT) weight CT_alpha for blending CCM1 and CCM2 by using a first blending unit 132, thereby generating a first blended CCM.

The adaptive color correction system 13 may also include an IR weight generator 133 that is coupled to receive an IR ratio (i.e., a ratio of an IR signal to color signals), which may be provided, for example, by an IR estimator 15. The IR weight generator 133 is configured to generate an IR weight IR_alpha for blending CCM3 and CCM4 by using a second blending unit 134, thereby generating a second blended CCM.

The adaptive color correction system 13 may further include a CRA weight generator 135 that is configured to generate a CRA weight CRA_alpha according to a pixel coordinate of the image. The generated CRA weight CRA_alpha is used to blend the first blended CCM and the second blended CCM by using a third blending unit 136, thereby generating a third (or final) blended CCM. The third blended CCM is finally used to perform color correction on color signals (e.g., R, G and B) by a color correction unit 137, thereby generating corrected color signals. The corrected color signals may be subjected to further processing, such as gamma correction by a gamma unit 16, as exemplified in FIG. 1.

Figure 3B:
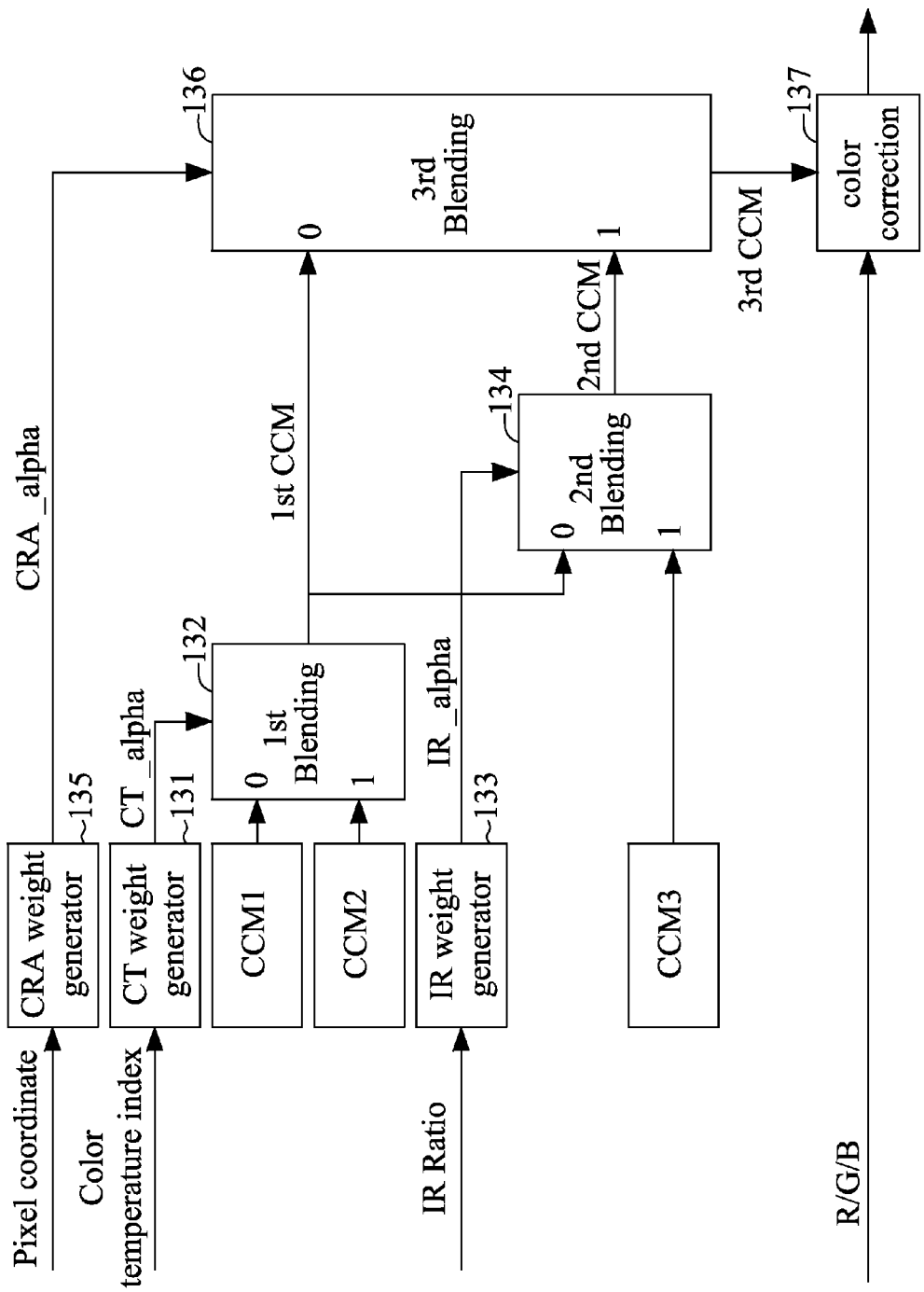
FIG. 3B shows a detailed block diagram of the adaptive color correction system of FIG. 1 according to a second specific embodiment of the present invention.

FIG. 3B shows a detailed block diagram of the adaptive color correction system of FIG. 1 according to a second specific embodiment of the present invention. The second specific embodiment is similar to the first specific embodiment except for the following difference. As shown in FIG. 3B, three color correction matrices CCM1, CCM2 and CCM3 are provided. Specifically, CCM1 represents a color correction matrix for a high color-temperature light source and for an image center, CCM2 represents a color correction matrix for a low color-temperature light source and for an image center, and CCM3 represents a color correction matrix for a light source with a high IR signal and for an image corner. The CT weight CT_alpha is used to blend CCM1 and CCM2 by using a first blending unit 132, thereby generating a first blended CCM. The IR weight IR_alpha is used to blend the first blended CCM and CCM3 by using a second blending unit 134, thereby generating a second blended CCM. The CRA weight CRA_alpha is used to blend the first blended CCM and the second blended CCM by using a third blending unit 136, thereby generating a third (or final) blended CCM.

Figure 3C:
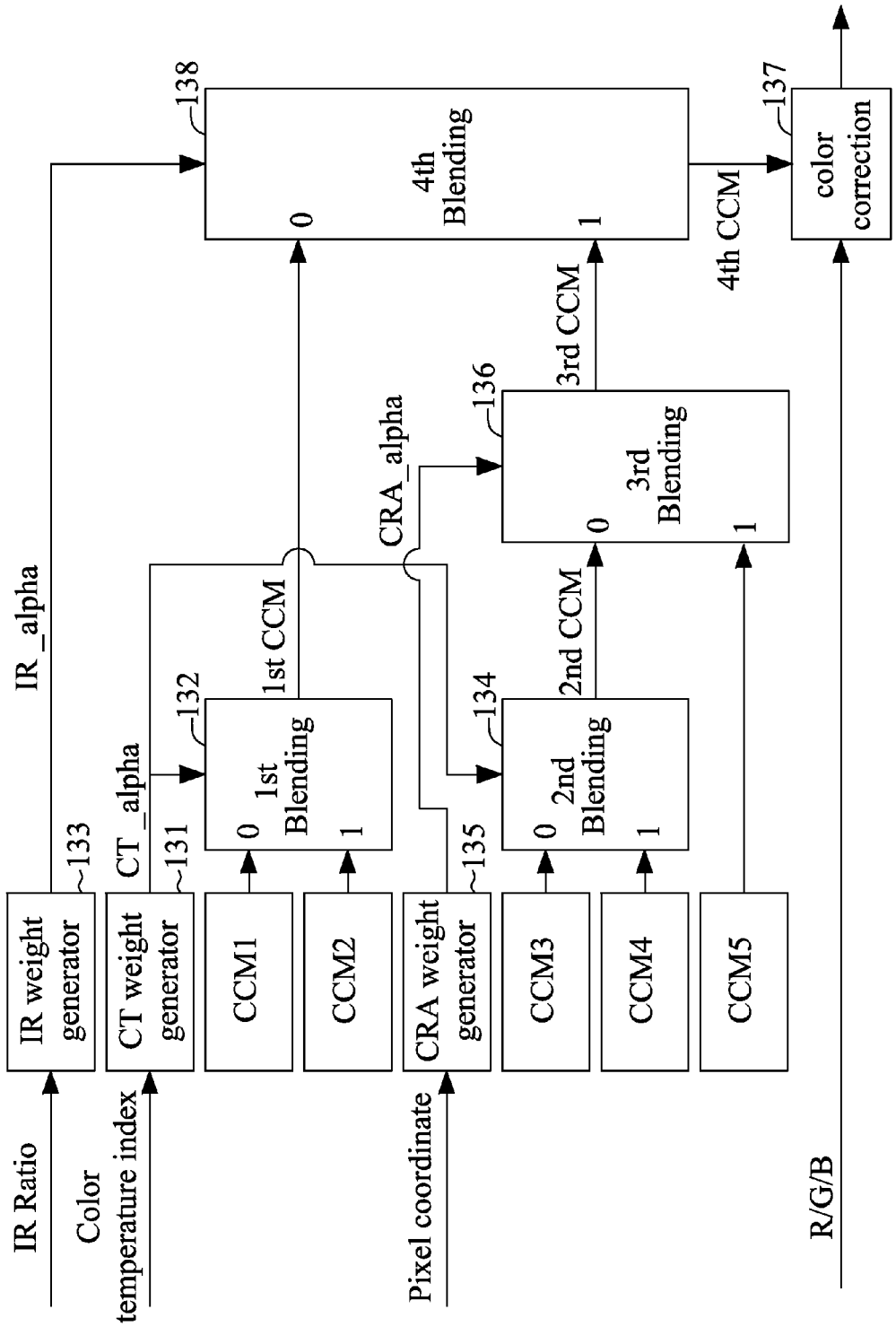
FIG. 3C shows a detailed block diagram of the adaptive color correction system of FIG. 1 according to a third specific embodiment of the present invention.

FIG. 3C shows a detailed block diagram of the adaptive color correction system of FIG. 1 according to a third specific embodiment of the present invention. The third specific embodiment is similar to the first specific embodiment except for the following difference. As shown in FIG. 3C, five color correction matrices CCM1, CCM2, CCM3, CCM4 and CCM5 are provided. Specifically, CCM1 represents a color correction matrix for a high color-temperature light source without IR signal, CCM2 represents a color correction matrix for a low color-temperature light source without IR signal, CCM3 represents a color correction matrix for a high color-temperature light source with an IR signal and for an image center, CCM4 represents a color correction matrix for a low color-temperature light source with an IR signal and for an image center, and CCM5 represents a color correction matrix with a high IR signal and for an image corner. The CT weight CT_alpha is used to blend CCM1 and CCM2 by using a first blending unit 132, thereby generating a first blended CCM. The CT weight CT_alpha is also used to blend CCM3 and CCM4 by using a second blending unit 134, thereby generating a second blended CCM. The CRA weight CRA_alpha is used to blend the second blended CCM and CCM5 by using a third blending unit 136, thereby generating a third blended CCM. The IR weight IR_alpha is used to blend the first blended CCM and the third blended CCM by using a fourth blending unit 138, thereby generating a fourth (or final) blended CCM.

Figure 4A:
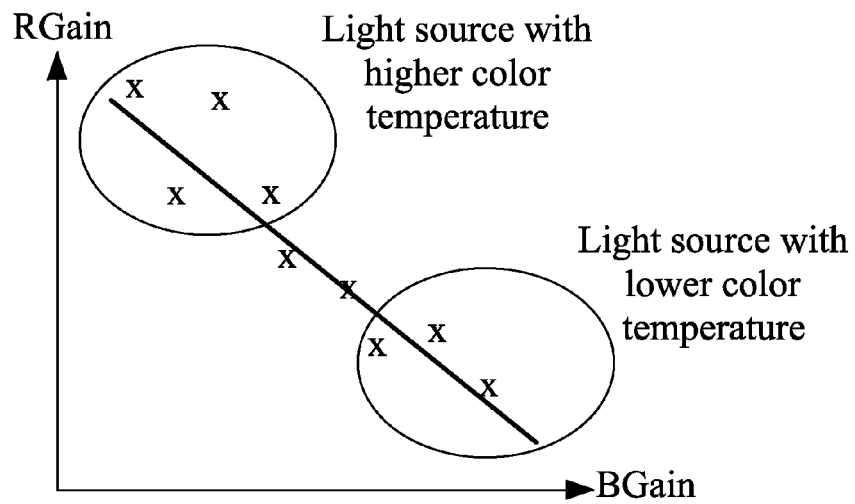
FIG. 4A shows a relationship among color temperatures, gains for red and gains for blue.

Details of implementing some pertinent blocks of FIG. 3A/3B/3C and FIG. 1 will be described in the following. The color temperature estimator 14 (FIG. 1) estimates a color temperature of a light source according to gains, which may be provided, for example, by a white balancing unit (not shown). Specifically, as exemplified by a relationship between gains for red (RGain) and gains for blue (BGain) in FIG. 4A, a high color-temperature light source contains more power for short wavelength band (i.e., blue). Therefore, a higher gain for red channel is needed to make a balanced white object with equal red, green and blue values. On the other hand, a low color-temperature light source contains more power for long wavelength band (i.e., red). Therefore, a higher gain for blue channel is needed to make a balanced white object with equal red, green and blue values. Accordingly, the color temperature estimator 14 may provide the color temperature index indicating an estimated color temperature of a light source, according to the gains, particularly the gains for red and blue. Specifically speaking, the color temperature index of the embodiment is a gain difference of blue and red (i.e., BGain−RGain).

Figure 4B:
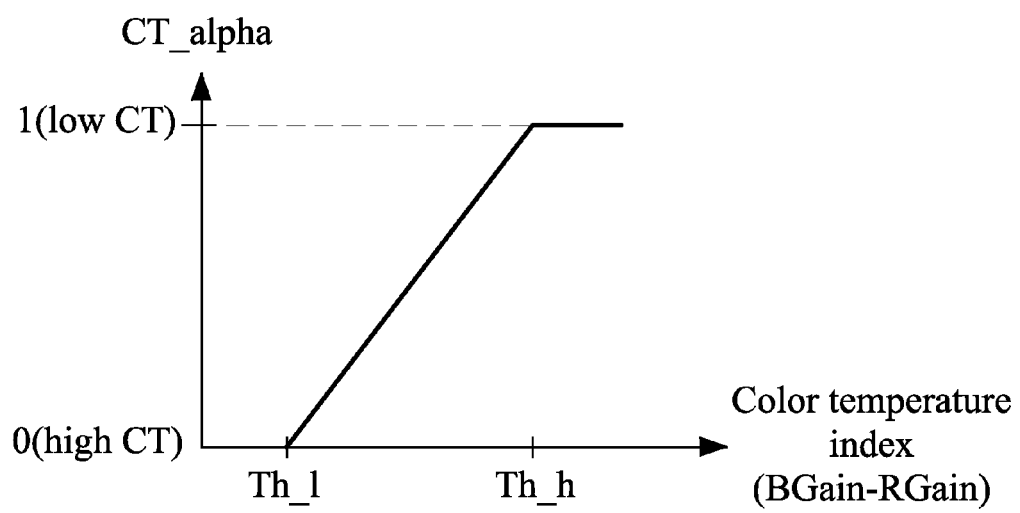
FIG. 4B shows a relationship between the CT weight and the gain difference of blue and red.

Afterwards, the CT weight generator 131 (FIG. 3A/3B/3C) generates the CT weight CT_alpha according to the color temperature index. FIG. 4B shows a relationship between the CT weight CT_alpha and the gain difference of blue and red. As exemplified in FIG. 4B, the CT weight CT_alpha linearly rises from 0 at a low threshold Th_l of the gain difference toward 1 at a high threshold Th_h of the gain difference. The CT weight CT_alpha is 0 when the gain difference is less than the low threshold Th_l, and the CT weight CT_alpha is 1 when the gain difference is greater than the high threshold Th_h.

Figure 5A:
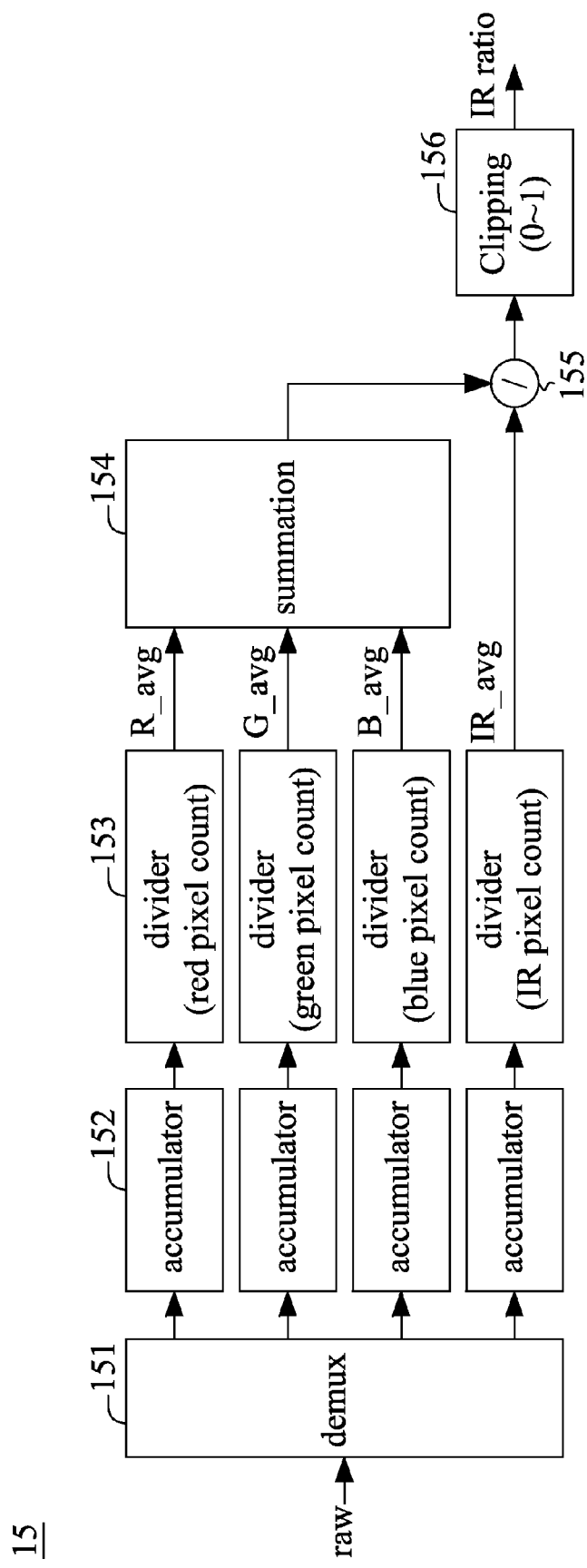
FIG. 5A shows a block diagram illustrated of the IR estimator of FIG. 1.

FIG. 5A shows a block diagram illustrated of the IR estimator 15 of FIG. 1. Specifically, raw signals (from the image sensor 23) are demultiplexed (by a demultiplexer 151) to accumulators 152 for red, green, blue and IR pixels, respectively. The accumulated red, green, blue and IR pixels (from the accumulators 152) are then divided (by pixel count) by dividers 153 for red, green, blue and IR pixels, respectively, thereby resulting in average signals for red, green, blue and IR pixels (i.e., R_avg, G_avg, B_avg and IR_avg). A summation unit 154 adds the average signals for red, green and blue pixels together, and the sum then divides the average signal for IR pixels (by a dividing unit 155). The quotient is then clipped within 0 and 1 by a clipping unit 156, thereby generating the IR ratio.

Figure 5B:
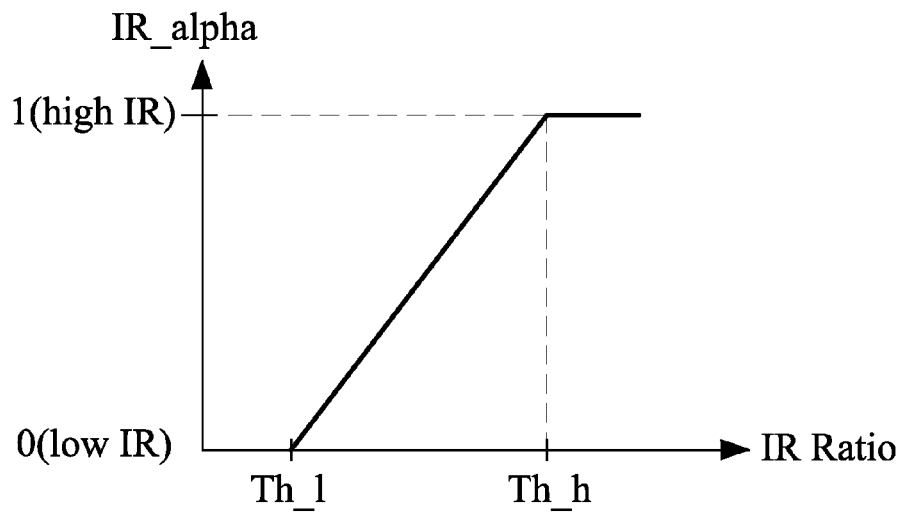
FIG. 5B shows a relationship between the IR weight and the IR ratio.

Subsequently, the IR weight generator 133 (FIG. 3A/3B/3C) generates the IR weight IR_alpha according to the IR ratio. FIG. 5B shows a relationship between the IR weight IR_alpha and the IR ratio. As exemplified in FIG. 5B, the IR weight IR_alpha linearly rises from 0 at a low threshold Th_l of the IR ratio toward 1 at a high threshold Th_h of the IR ratio. The IR weight IR_alpha is 0 when the IR ratio is less than the low threshold Th_l, and the IR weight IR_alpha is 1 when the IR ratio is greater than the high threshold Th_h.

Figure 6A:
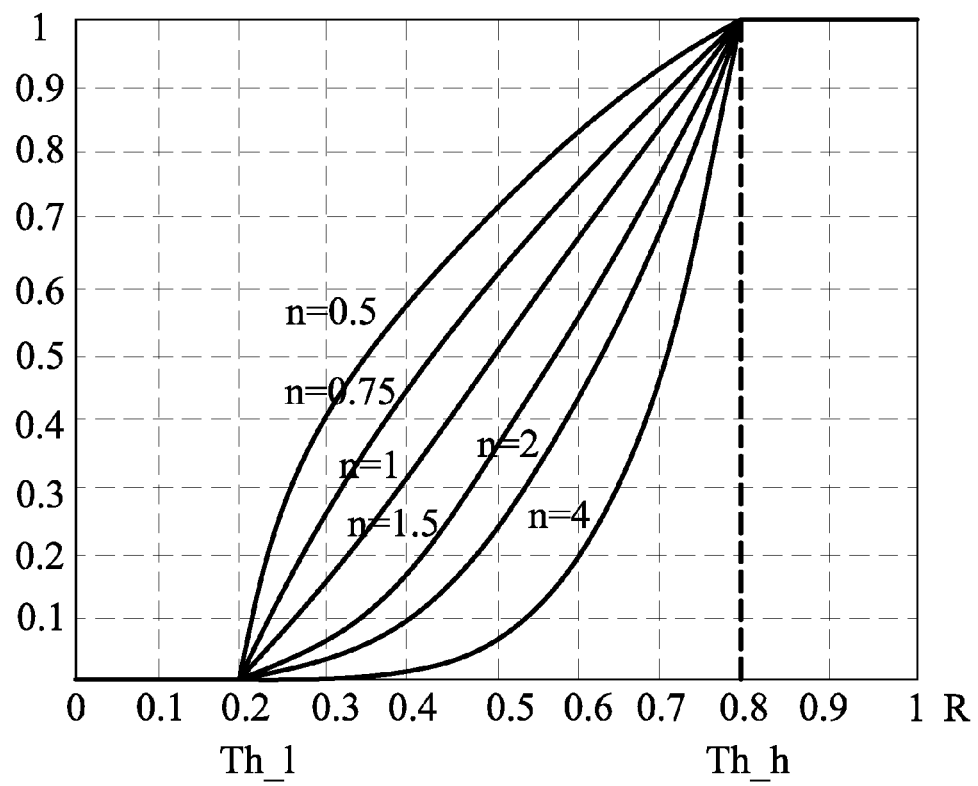
FIG. 6A shows a relationship between the CRA weight and a distance of a pixel with respect to an image center.
Figure 6B:
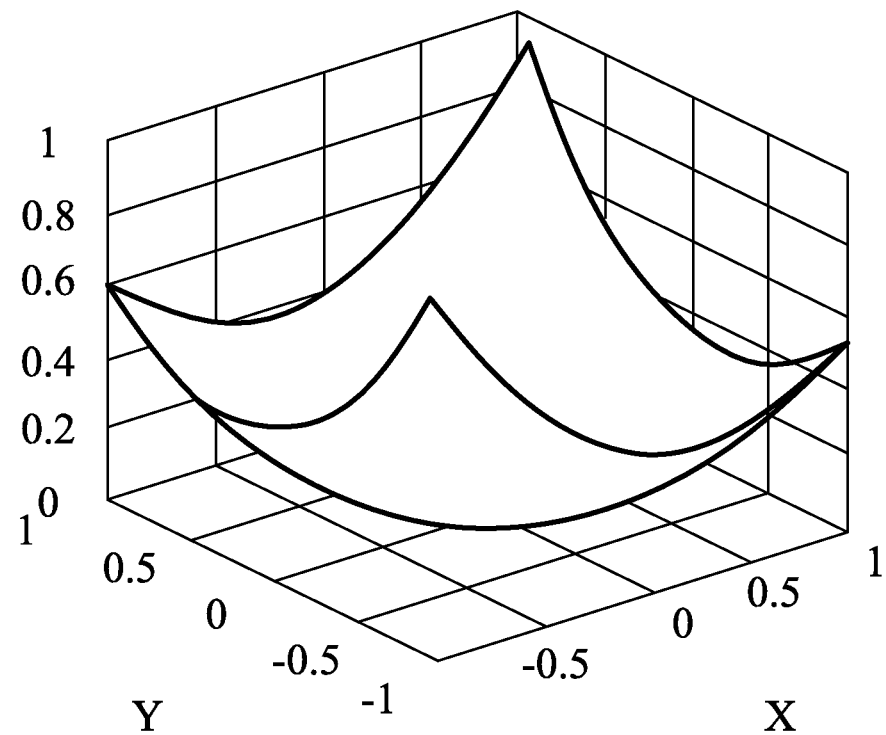
FIG. 6B shows another relationship among the CRA weight, an X-coordinate and a Y-coordinate.

Regarding the CRA weight generator 135 in FIG. 3A/3B/3C, FIG. 6A shows a relationship between the CRA weight CRA_alpha and a (scaled) distance R of a pixel with respect to an image center. As exemplified in FIG. 6A, the CRA weight CRA_alpha linearly or nonlinearly rises from 0 at a low threshold Th_l of the distance R toward 1 at a high threshold Th_h of the distance R. The CRA weight CRA_alpha is 0 when the distance R is less than the low threshold Th_l, and the CRA weight CRA_alpha is 1 when the distance R is greater than the high threshold Th_h. FIG. 6B shows another relationship among the CRA weight CRA_alpha, a (scaled) X-coordinate and a (scaled) Y-coordinate.

The first blending unit 132, the second blending unit 134, the third blending unit 136 and the fourth blending unit 138 in FIG. 3A/3B/3C may be performed as expressed below:

$$\begin{bmatrix} e_1 & e_2 & e_3 \\ e_4 & e_5 & e_6 \\ e_7 & e_8 & e_9 \end{bmatrix} = \text{alpha} \cdot \begin{bmatrix} c_1 & c_2 & c_3 \\ c_4 & c_5 & c_6 \\ c_7 & c_8 & c_9 \end{bmatrix} + (1 - \text{alpha}) \cdot \begin{bmatrix} d_1 & d_2 & d_3 \\ d_4 & d_5 & d_6 \\ d_7 & d_8 & d_9 \end{bmatrix}$$

where alpha represents CT_alpha, IR_alpha or CRA_alpha, [c1 . . . c9] and [d1 . . . d9] represent CCM inputs to the blending unit, and [e1 . . . e9] represents a CCM output form the blending unit.

Alternatively, for better performance, different CRA_alpha may be used in the third blending unit 136 as expressed below:

$$\begin{bmatrix} e_1 & e_2 & e_3 \\ e_4 & e_5 & e_6 \\ e_7 & e_8 & e_9 \end{bmatrix} = \begin{bmatrix} \alpha_1(x,y) \cdot c_1 + (1-\alpha_1(x,y)) \cdot d_1 & \alpha_2(x,y) \cdot c_2 + (1-\alpha_2(x,y)) \cdot d_2 & \alpha_3(x,y) \cdot c_3 + (1-\alpha_3(x,y)) \cdot d_3 \\ \alpha_4(x,y) \cdot c_4 + (1-\alpha_4(x,y)) \cdot d_4 & \alpha_5(x,y) \cdot c_5 + (1-\alpha_5(x,y)) \cdot d_5 & \alpha_6(x,y) \cdot c_6 + (1-\alpha_6(x,y)) \cdot d_6 \\ \alpha_7(x,y) \cdot c_7 + (1-\alpha_7(x,y)) \cdot d_7 & \alpha_8(x,y) \cdot c_8 + (1-\alpha_8(x,y)) \cdot d_8 & \alpha_9(x,y) \cdot c_9 + (1-\alpha_9(x,y)) \cdot d_9 \end{bmatrix}$$

The color correction unit 137 in FIG. 3A/3B/3C may be performed as expressed below:

$$\begin{bmatrix} R_o \\ G_o \\ B_o \end{bmatrix} = \begin{bmatrix} c_1 & c_2 & c_3 \\ c_4 & c_5 & c_6 \\ c_7 & c_8 & c_9 \end{bmatrix} \begin{bmatrix} R_i \\ G_i \\ B_i \end{bmatrix}$$

where [Ri Gi Bi] represents the color (i.e., R, G and B) signals, and [Ro Go Bo] represents the corrected color (i.e., R, G and B) signals, and [c1 . . . c9] represents the final blended color correction matrix.

Although specific embodiments have been illustrated and described, it will be appreciated by those skilled in the art that various modifications may be made without departing from the scope of the present invention, which is intended to be limited solely by the appended claims.

What is claimed is:

1. An image processing system adaptable to a dual-mode image device, comprising:
   an adaptive color correction system coupled to receive an image, and configured to adaptively correct for color distortion according to a chief ray angle (CRA) of a pixel of the image and an IR signal from the dual-mode image device associated with a light source,
   wherein the dual-mode image device comprises:
      a lens that passes light;
      a dual-band IR-cut filter that optically receives the light passed from the lens in order to pass visible light and a range of IR light;
      a filter array composed of color filters and IR filters, the filter array optically receiving the light passed from the dual-band IR-cut filter in order to generate optical color information; and
      an image sensor disposed below the filter array to convert the optical color information to an electronic signal.

2. The image processing system of claim 1, wherein the adaptive color correction system performs correction further according to a color temperature of the light source.

3. The image processing system of claim 2, wherein the adaptive color correction system performs correction according to the color temperature and an image center.

4. The image processing system of claim 3, wherein the adaptive color correction system performs correction according to the IR signal and an image corner.

5. The image processing system of claim 4, wherein the adaptive color correction system comprises:
   a plurality of color correction matrices (CCMs) for different color-temperature light sources, IR signals or CRAs;
   a color temperature (CT) weight generator that receives a color temperature index and accordingly generates a color temperature (CT) weight;
   an IR weight generator that receives an IR ratio and accordingly generates an IR weight;
   a CRA weight generator that generates a CRA weight according to a pixel coordinate of the image; and a color correction unit that performs color correction on color signals of the image, thereby generating corrected color signals;

wherein the plurality of CCMs are blended to generate a final blended CCM according to the CT weight, the IR weight and the CRA weight; and the color correction unit is performed according to the final blended CCM.

6. The image processing system of claim 5, further comprising a color temperature estimator that estimates the color temperature of the light source according to gains, thereby generating the color temperature index.

7. The image processing system of claim 6, wherein the color temperature index is a gain difference of blue and red.

8. The image processing system of claim 7, wherein the CT weight linearly increases from 0 at a predetermined low threshold of the gain difference toward 1 at a predetermined high threshold of the gain difference.

9. The image processing system of claim 5, further comprising an IR estimator that receives raw signals from the dual-mode image device, and accordingly generates the IR ratio.

10. The image processing system of claim 9, wherein the IR estimator comprises:
a demultiplexer that demultiplexes the raw signals;
a plurality of accumulators that receive demultiplexed raw signals, and then accumulate color pixels and IR pixels respectively;
a plurality of dividers that respectively divide accumulated color pixels and IR pixels by corresponding pixel counts, thereby resulting in average signals for color pixels and IR pixels;
a summation unit that adds the average signals for color pixels to generate a sum;
a dividing unit that divides the average signal for IR pixels by the sum, thereby generating a quotient; and
a clipping unit that clips the quotient, thereby generating the IR ratio.

11. The image processing system of claim 9, wherein the IR weight linearly increases from 0 at a predetermined low threshold of the IR ratio toward 1 at a predetermined high threshold of the IR ratio.

12. The image processing system of claim 5, wherein:
the plurality of CCMs include a first CCM representing a color correction matrix for a high color-temperature light source and for the image center, a second CCM representing a color correction matrix for a low color-temperature light source and for the image center, a third CCM representing a color correction matrix for a light source with a low IR signal and for the image corner, and a fourth CCM representing a color correction matrix for a light source with a high IR signal and for the image corner;
the first CCM and the second CCM are blended according to the CT weight, thereby generating a first blended CCM;
the third CCM and the fourth CCM are blended according to the IR weight, thereby generating a second blended CCM; and
the first blended CCM and the second blended CCM are blended according to the CRA weight, thereby generating the final blended CCM.

13. The image processing system of claim 5, wherein:
the plurality of CCMs include a first CCM representing a color correction matrix for a high color-temperature light source and for the image center, a second CCM representing a color correction matrix for a low color-temperature light source and for the image center, and a third CCM representing a color correction matrix for a light source with a high IR signal and for the image corner;
the first CCM and the second CCM are blended according to the CT weight, thereby generating a first blended CCM;
the first blended CCM and the third CCM are blended according to the IR weight, thereby generating a second blended CCM; and
the first blended CCM and the second blended CCM are blended according to the CRA weight, thereby generating the final blended CCM.

14. The image processing system of claim 5, wherein:
the plurality of CCMs include a first CCM representing a color correction matrix for a high color-temperature light source without IR signal, a second CCM representing a color correction matrix for a low color-temperature light source without IR signal, a third CCM representing a color correction matrix for a high color-temperature light source with an IR signal and for the image center, a fourth CCM representing a color correction matrix for a low color-temperature light source with an IR signal and for the image center, and a fifth CCM representing a color correction matrix for a light source with a high IR signal and for the image corner;
the first CCM and the second CCM are blended according to the CT weight, thereby generating a first blended CCM;
the third CCM and the fourth CCM are blended according to the CT weight, thereby generating a second blended CCM;
the second blended CCM and the fifth CCM are blended according to the CRA weight, thereby generating a third blended CCM; and
the first blended CCM and the third blended CCM are blended according to the IR weight, thereby generating the final blended CCM.

15. The image processing system of claim 1, further comprising a lens shading correction (LSC) unit that receives an electronic signal from the dual-mode image device, and corrects for lens shading artifacts.

16. The image processing system of claim 15, further comprising a demosaicking unit that receives an output of the LSC unit, and reconstructs the image from color samples outputted from the dual-mode image device.

* * * * *